US011571986B2

(12) United States Patent
Kinomura et al.

(10) Patent No.: US 11,571,986 B2
(45) Date of Patent: Feb. 7, 2023

(54) MANAGING THE EXCHANGE BETWEEN A POWER GRID AND CHARGING/DISCHARGING STATIONS

(71) Applicant: Toyota Jidosha Kabushiki Kaisha, Toyota (JP)

(72) Inventors: Shigeki Kinomura, Toyota (JP); Hironobu Kitaoka, Nisshin (JP); Toru Nakamura, Toyota (JP); Hidetoshi Kusumi, Nagoya (JP); Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 17/170,195

(22) Filed: Feb. 8, 2021

(65) Prior Publication Data
US 2021/0252993 A1  Aug. 19, 2021

(30) Foreign Application Priority Data

Feb. 14, 2020 (JP) .............................. JP2020-023302

(51) Int. Cl.
*B60L 53/68* (2019.01)
*H02J 13/00* (2006.01)
(Continued)

(52) U.S. Cl.
CPC ............. *B60L 53/68* (2019.02); *B60L 53/665* (2019.02); *G05B 15/02* (2013.01);
(Continued)

(58) Field of Classification Search
None
See application file for complete search history.

(56) References Cited

U.S. PATENT DOCUMENTS 9,340,117 B2 *  5/2016  Momose ................. B60L 53/31
9,561,732 B2 *  2/2017  Kaneko ................... B60L 53/63
(Continued)

FOREIGN PATENT DOCUMENTS

JP  2015-211482 A  11/2015
JP  2016-001987 A   1/2016
JP      6156499 B2   7/2017

OTHER PUBLICATIONS

Tushar et al., "Demand-Side Management by Regulating Charging and Discharging of the EV, ESS, and Utilizing Renewable Energy", IEEE Transactions on Industrial Informatics, vol. 14, No. 1, Jan. 2018. (Year: 2018).*

(Continued)

*Primary Examiner* — Mohammad Ali
*Assistant Examiner* — Kelvin Booker
(74) *Attorney, Agent, or Firm* — Dinsmore & Shohl LLP

(57) ABSTRACT

The server executes a process that includes receiving predetermined information from each terminal in a facility, if it is determined that the electric vehicle is connected to a charging/discharging station, associating a user or a user terminal with the charging/discharging station, scheduling a power demand and supply adjustment, receiving behavior information of the user, if it is determined that it is necessary to reschedule the power demand and supply adjustment, predicting a connection period, rescheduling the power demand and supply adjustment, and if the current time has reached the start time of a power supply and supply adjustment period, executing the power demand and supply adjustment.

5 Claims, 4 Drawing Sheets

(51) Int. Cl.
  *G07C 5/00* (2006.01)
  *G06Q 50/06* (2012.01)
  *G05B 15/02* (2006.01)
  *B60L 53/66* (2019.01)
  *G06Q 10/06* (2012.01)
  *G06Q 20/20* (2012.01)

(52) U.S. Cl.
  CPC ..... *G06Q 10/06312* (2013.01); *G06Q 20/202* (2013.01); *G06Q 50/06* (2013.01); *G07C 5/008* (2013.01); *H02J 13/00002* (2020.01); *H02J 13/00022* (2020.01); *H02J 2203/20* (2020.01)

(56) References Cited

U.S. PATENT DOCUMENTS

| | | | | |
|---|---|---|---|---|
| 9,766,671 | B2* | 9/2017 | Dorn | B60L 53/62 |
| 10,126,796 | B2* | 11/2018 | Dorn | B60L 53/63 |
| 2008/0039989 | A1* | 2/2008 | Pollack | B60L 55/00 701/22 |
| 2011/0004358 | A1* | 1/2011 | Pollack | H02J 3/381 700/297 |
| 2011/0202418 | A1* | 8/2011 | Kempton | G06Q 30/0601 705/26.1 |
| 2012/0245750 | A1* | 9/2012 | Paul | H02J 3/14 700/291 |
| 2013/0211988 | A1* | 8/2013 | Dorn | G08G 1/20 700/297 |
| 2014/0028254 | A1* | 1/2014 | Shane | B60L 3/12 320/109 |
| 2014/0077766 | A1* | 3/2014 | Takeuchi | B60L 55/00 320/128 |
| 2014/0088781 | A1* | 3/2014 | Kearns | H02J 13/00022 700/295 |
| 2015/0298565 | A1* | 10/2015 | Iwamura | G06Q 10/0631 701/22 |
| 2015/0338869 | A1* | 11/2015 | Behrangrad | G05F 1/66 700/291 |
| 2016/0164313 | A1 | 6/2016 | Ohta et al. | |
| 2017/0259683 | A1* | 9/2017 | Shimizu | B60L 53/64 |
| 2018/0018007 | A1* | 1/2018 | Dorn | G06Q 50/06 |
| 2018/0032920 | A1* | 2/2018 | Ito | G06Q 10/02 |
| 2019/0143828 | A1* | 5/2019 | Sawada | G06Q 10/02 340/934 |
| 2019/0184850 | A1* | 6/2019 | Lee | B60L 53/68 |
| 2019/0193573 | A1* | 6/2019 | Iwai | B60L 53/67 |

OTHER PUBLICATIONS

Zhou et al., "The Charging and Discharging Power Prediction for Electric Vehicles", 2016 IEEE. (Year: 2016).*

Kisacikoglu et al., "Distributed Control of PEV Charging Based on Energy Demand Forecast", IEEE Transactions on Industrial Informatics, vol. 14, No. 1, Jan. 2018. (Year: 2018).*

Kumar et al., "Energy Management in Smart Distribution Systems With Vehicle-to-Grid Integrated Microgrids", IEEE Transactions on Smart Grid, vol. 9, No. 5, Sep. 2018. (Year: 2018).*

Qian et al., "Load Model for Prediction of Electric Vehicle Charging Demand", 2010 International Conference on Power System Technology. (Year: 2010).*

Kennel et al., "Energy Management for Smart Grids With Electric Vehicles Based on Hierarchical MPC", IEEE Transactions on Industrial Informatics, vol. 9, No. 3, Aug. 2013. (Year: 2013).*

* cited by examiner

MANAGING THE EXCHANGE BETWEEN A POWER GRID AND CHARGING/DISCHARGING STATIONS

CROSS REFERENCE TO RELATED APPLICATIONS

This non-provisional application is based on Japanese Patent Application No. 2020-023302 filed on Feb. 14, 2020 with the Japan Patent Office, the entire contents of which are hereby incorporated by reference.

BACKGROUND

Field

The present disclosure relates to a technique for managing electric power to be exchanged between a power grid and a power storage device mounted on each of a plurality of electric vehicles.

Description of the Background Art

Conventionally, there is known a virtual power plant (hereinafter, referred to as VPP) which functions as a single power plant that uses a server or the like to remotely and integrally control a plurality of small-scale energy resources such as a plurality of power storage devices, each of which is mounted on each of a plurality of electric vehicles. The VPP may change the power supply from the power grid so as to level the power demand by, for example, charging or discharging the power storage device mounted on each of a plurality of electric vehicles during an appropriate period. Thus, the plurality of electric vehicles may participate in the power demand leveling after being connected to a plurality of charging stations installed at a parking space of a store or a house.

For example, Japanese Patent No. 6156499 discloses a technique in which a commit instruction set for each charging apparatus is transmitted to each charging apparatus in a plurality of charging apparatuses in response to a power demand and supply adjustment command.

SUMMARY

The power demand leveling requires that a plurality of electric vehicles are continuously connected to the charging stations. However, for example, in a place such as a store where people frequently go in and out, users may use electric vehicles at the time of going home, and thereby, it is difficult to maintain a plurality of electric vehicles connected. In other words, even if the electric vehicles are connected to the charging stations at a time where the power demand leveling is scheduled, after the start of the power demand leveling or during the power demand leveling, the number of electric vehicles used in the power demand leveling may decrease. Therefore, the store may not have sufficient amount of charging and discharging power required to level the power demand. Japanese Patent No. 6156499 does not take into account the fact that the number of electric vehicles participating in the power demand leveling may decrease due to the use of the electric vehicles by the users.

An object of the present disclosure is to provide a power management system, a power management method, and a power management apparatus capable of appropriately leveling a power demand in response to the use of electric vehicles.

A power management system according to an aspect of the present disclosure is a power management system that manages electric power to be exchanged between a power grid and a charging/discharging station to be connected to a plurality of electric vehicles, each of the plurality of electric vehicles is equipped with a power storage device. The power management system includes a server that adjusts the electric power to be exchanged between the power grid and the charging/discharging station, and an information terminal that communicates with the server. The information terminal includes at least one of a first terminal that is carried by a user of any one of the plurality of electric vehicles and a second terminal that acquires information about the plurality of electric vehicles and/or the user from a facility where the charging/discharging station is disposed. The server acquires behavior information indicating a behavior condition of each user of the plurality of electric vehicles from the information terminal. The server predicts a connection period of the electric vehicle connected to the charging/discharging station until the electric vehicle is used for the next time based on the acquired behavior information. The server adjusts the electric power to be exchanged between the power grid and the charging/discharging station during a power demand and supply adjustment period by using a first electric vehicle among the plurality of electric vehicles, the connection period of the first electric vehicle including the power demand and supply adjustment period.

If the power demand and supply adjustment period is included in the connection period of an electric vehicle, the electric vehicle will not be used during the power demand and supply adjustment period. Therefore, by using such an electric vehicle to adjust the electric power to be exchanged between the charging/discharging station and the power grid during the power demand and supply adjustment period, it is possible to level the power demand without having the number of electric vehicles reduced.

In an embodiment, the server adjusts the electric power to be exchanged between the charging and discharging station and the power grid during the demand and supply adjustment period without using an electric vehicle among the plurality of electric vehicles, the connection period of the first electric vehicle not including the power demand and supply adjustment period.

If the power demand and supply adjustment period is not included in the connection period of an electric vehicle, the electric vehicle may be used during the power demand and supply adjustment period. Thus, by adjusting the electric power to be exchanged between the charging/discharging station and the power grid during the power demand and supply adjustment period without using such an electric vehicle, it is possible to level the power demand without having the number of electric vehicles reduced.

In another embodiment, the behavior information includes at least one of position information of the first terminal acquired from the first terminal, payment information or settlement information of the user acquired from the second terminal, and position information of the user acquired from an image of the user captured by the second terminal.

Thus, at least one of the position information of the first terminal, the payment information or the settlement information of the user, and the position information of the user may be used to predict the connection period of the electric vehicle connected to the charging/discharging station until the electric vehicle is used for the next time.

A power management method according to another aspect of the present disclosure is a power management method power management method that uses an information terminal to manage electric power to be exchanged between a power grid and a charging/discharging station to be connected to a plurality of electric vehicles, each of the plurality of electric vehicles being equipped with a power storage device. The information terminal includes at least one of a first terminal that is carried by a user of any one of the plurality of electric vehicles and a second terminal that acquires information about the plurality of electric vehicles and/or the user from a facility where the charging/discharging station is disposed. The power management method includes: acquiring behavioral information indicating a behavior condition of each user of the plurality of electric vehicles from the information terminal; predicting a connection period of the electric vehicle connected to the charging/discharging station until the electric vehicle is used for the next time based on the acquired behavior information; and adjusting the electric power to be exchanged between the charging/discharging station and the power grid during a power demand and supply adjustment period by using an electric vehicle among the plurality of electric vehicles, the connection period of the first vehicle including the power demand and supply adjustment period.

A power management apparatus according to still another aspect of the present disclosure is a power management apparatus that uses an information terminal to manage electric power to be exchanged between a power grid and a charging/discharging station to be connected to a plurality of electric vehicles, each of which is equipped with a power storage device. The information terminal includes at least one of a first terminal that is carried by a user of any one of the plurality of electric vehicles and a second terminal that acquires information about the plurality of electric vehicles and/or the user from a facility where the charging/discharging station is disposed. The power management apparatus acquires behavior information indicating a behavior condition of each user of the plurality of electric vehicles from the information terminal. The power management apparatus predicts a connection period of the electric vehicle connected to the charging/discharging station until the electric vehicle is used for the next time based on the acquired behavior information. The power management apparatus adjusts the electric power to be exchanged between the charging/discharging station and the power grid during a power demand and supply adjustment period by using an electric vehicle among the plurality of electric vehicles, the connection period of the first vehicle the power demand and supply adjustment period.

The foregoing and other objects, features, aspects and advantages of the present disclosure will become more apparent from the following detailed description of the present disclosure when taken in conjunction with the accompanying drawings.

DETAILED DESCRIPTION

Figure 1:
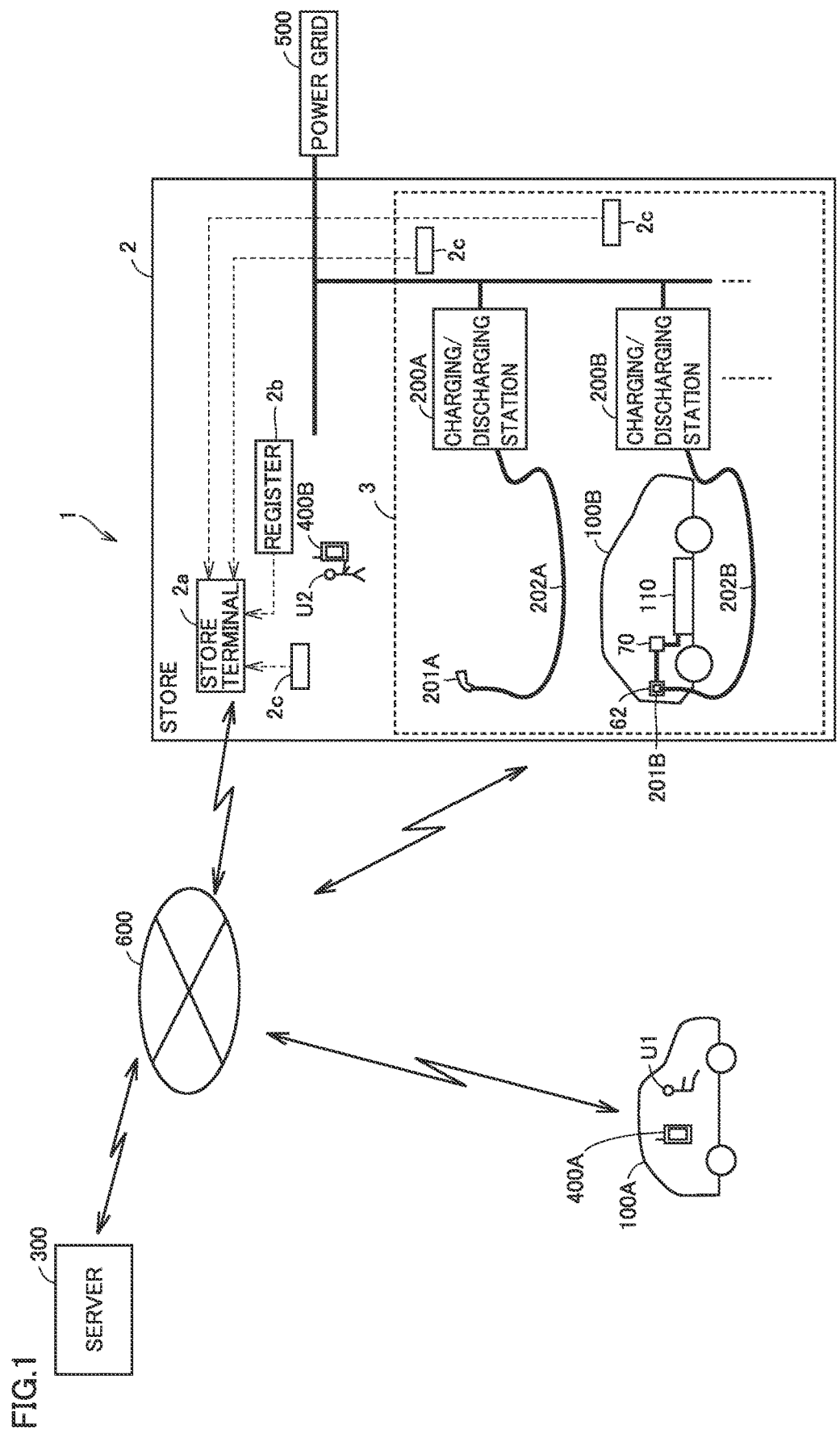
FIG. 1 is a diagram illustrating a configuration example of a power management system according to the present embodiment.

Hereinafter, an embodiment of the present disclosure will be described in detail with reference to the drawings. In the drawings, the same or corresponding portions are denoted by the same reference numerals, and the description thereof will not be repeated.

FIG. 1 is a diagram illustrating a configuration example of a power management system 1 according to the present embodiment. As illustrated in FIG. 1, a power management system 1 according to the present embodiment includes a store 2, charging/discharging stations 200A and 200B, electric vehicles 100A and 100B, a server 300, user terminals 400A and 400B, and a communication network 600. Note that three or more charging/discharging stations may be disposed in a parking lot 3, but FIG. 1 only illustrates two charging/discharging stations 200A and 200B as an example. Although as an example, FIG. 1 only illustrates that the electric vehicle 100B is connected to the charging/discharging station 200B, a plurality of electric vehicles may be connected to the other charging/discharging stations in the parking lot 3.

The store 2 is a facility that provides various products and various services to customers, and may include, for example, a retail store such as a supermarket, a restaurant, a bathroom, a movie theater, an accommodation facility, or a composite facility thereof.

The store 2 is installed with a store terminal 2a, a register 2b, and a camera 2c. Electric power is supplied from a power grid 500 to various electric devices including these electric devices installed in the store 2.

The store terminal 2a is configured to acquire information (for example, information about an electric vehicle connected to a charging/discharging station and/or a user of the electric vehicle) from the store 2.

The register 2b is used to process, for example, a payment or a settlement between an employee of the store 2 and a customer of the store 2 in a trade transaction of products. The register 2b stores payment information about the payment or settlement information about the settlement, and transmits the same to the store terminal 2a. The payment or the settlement may be processed on a user terminal by electronic money, for example. The payment information or the settlement information include information about the store in the trade transaction, information about the sold products, information about customers, and the like. The store terminal 2a transmits the information acquired from the register 2b to a predetermined server via the communication network 600. In the present embodiment, the predetermined server includes the server 300.

A plurality of cameras 2c are installed in the store 2 at predetermined positions (for example, at the entrance/exit of the store 2 and at a parking space where a charging/discharging station is disposed). The camera 2c captures an image or video of the inside of the store 2 and/or an image or video of the inside of the parking lot 3, and transmits the captured image or video to the store terminal 2a. The store terminal 2a stores the image or video received from the camera 2c and transmits the image or video to the server 300. A plurality of cameras 2c may be installed in the parking lot 3. For example, each of the plurality of cameras 2c may be installed at each parking space for parking one electric vehicle. Each of the plurality of cameras 2c is configured to photograph a user and an electric vehicle when the user is moving the electric vehicle so as to park the electric vehicle at a parking space or when the user is parking the electric vehicle at a parking space.

The electric vehicle 100B is, for example, an electric vehicle provided with an inlet 62, a power converter 70, and a battery 110 that stores electric power for travelling. The electric vehicle 100A may have the same configuration as the electric vehicle 100B. It is assumed that the electric vehicle 100A is being driven by the user U1 and the electric vehicle 100B is being parked in the parking lot 3 at a parking space.

The charging/discharging stations 200A and 200B are installed in the parking lot 3. Each of the charging/discharging stations 200A and 200B is connected by a power line branched from a main power line installed in the store 2.

One end of a cable 202A is connected to the charging/discharging station 200A, and the other end of the cable 202A is provided with a connector 201A. The connector 201A is connected to an electric vehicle.

One end of a cable 202B is connected to the charging/discharging station 200B, and the other end of the cable 202B is provided with a connector 201B. The connector 201B is connected to the inlet 62 of the electric vehicle 100B.

The server 300 is configured to communicate with the store terminal 2a, the electric vehicles 100A and 100B, and the user terminals 400A and 400B, which will be described later, via the communication network 600. The server 300 manages electric power to be exchanged between the store 2 and the power grid 500. The exchange of electric power between the store 2 and the power grid 500 includes supplying electric power from the store 2 to the power grid 500 or stopping the supply of electric power from the store 2 to the power grid 500 and/or supplying electric power from the power grid 500 to the store 2 or stopping the supply of electric power from the power grid 500 to the store 2. The server 300 is configured to send an execution command to a charging/discharging station via the communication network 600 so as to perform at least one of an operation of charging the battery 110 mounted on the electric vehicle connected to the charging/discharging station 200B, an operation of receiving electric power from the battery 110, an operation of stopping charging the battery 110, and an operation of stopping receiving power from the battery 110.

Further, the server 300 is configured to store an image or a video received from the store terminal 2a, and execute a predetermined image processing on the image or the video. The predetermined image processing includes, for example, extracting a vehicle type, an automobile identification number and the like of an electric vehicle from the image, and extracting an image of the user (such as a face image of the user) from the image so as to identify the user. The image processing may include, for example, employing AI (Artificial Intelligence) or machine learning. Through the image processing, the server 300 may identify, for example, the user of an electric vehicle parked at the parking space, or identify the destination of the identified user in the store 2 from the image captured by the camera 2c.

The user terminal 400A and the user terminal 400B are carried by the user U1 and the user U2, respectively, and may include, for example, any mobile terminal such as a mobile phone, a smartphone, or a smart watch.

The user terminals 400A and 400B are configured to communicate with the server 300 via the communication network 600 that includes a wireless communication base station installed inside or outside the store 2, Internet and the like. The user terminals 400A and 400B are configured to communicate with a wireless communication base station via a predetermined communication format. The predetermined communication format includes, for example, wireless communication in accordance with a wireless communication method using a wireless LAN (Local Area Network) or a wireless communication standard such as 3G, 4G or 5G for mobile phone.

Figure 2:
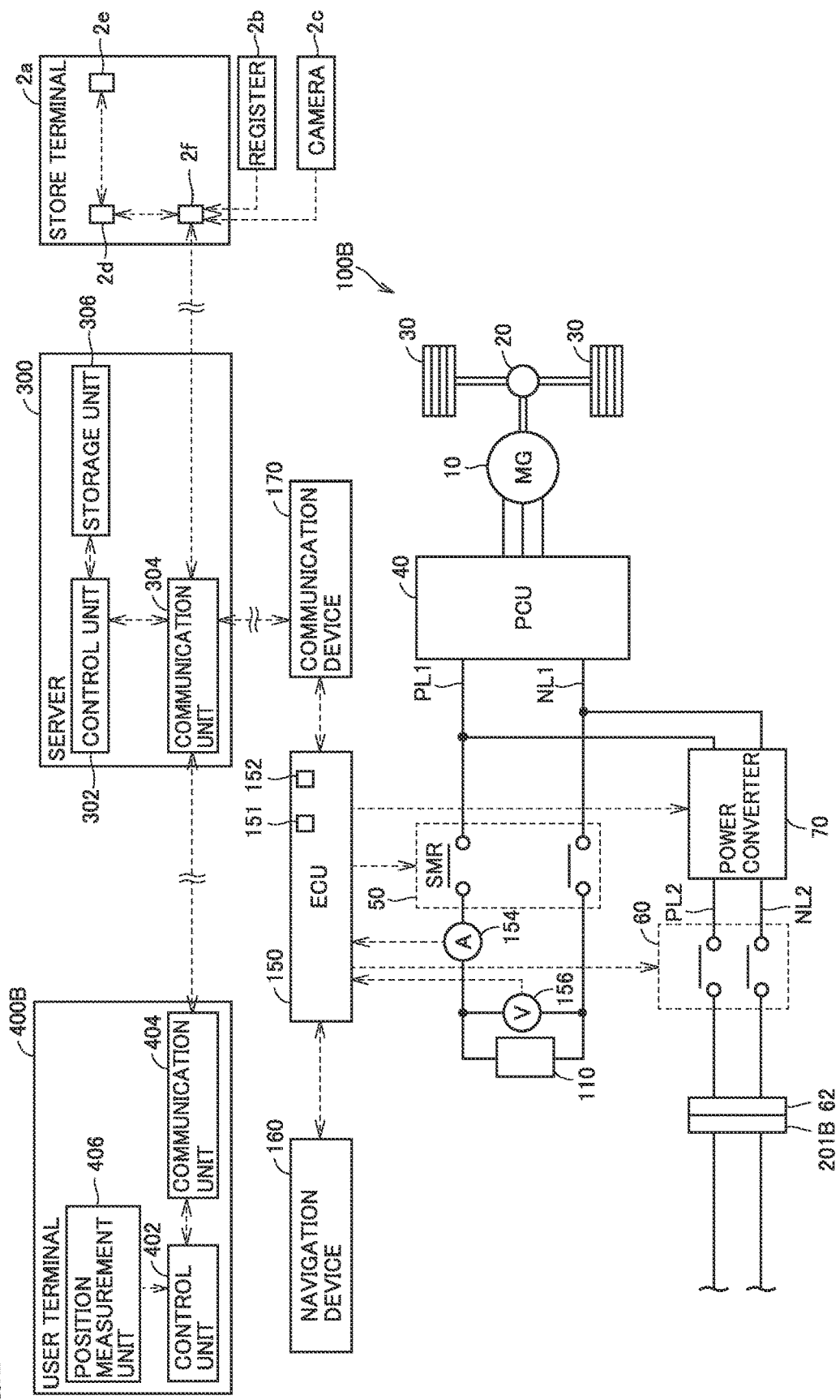
FIG. 2 is a diagram illustrating a specific configuration example of the power management system.

Each of the user terminals 400A and 400B is provided with, for example, a position measurement unit (see FIG. 2). Each of the user terminals 400A and 400B may acquire the position information of each terminal from an output result of the position measurement unit. The position measurement unit may be any wireless communication device using GPS (Global Positioning System) or WiFi.

The power grid 500 is a power system constructed by, for example, a power plant installed with a power generator for generating electricity, a power transmission and distribution facility including a power transmission line, a substation, a distribution line and the like, and is connected to the store 2 so as to exchange power with the store 2.

FIG. 2 is a diagram illustrating a specific configuration example of the power management system. Since the electric vehicle 100A has the same configuration as the electric vehicle 100B, the detailed description thereof will not be repeated. Further, since the user terminal 400A has the same configuration as the user terminal 400B, the detailed description thereof will not be repeated.

As illustrated in FIG. 2, the electric vehicle 100B includes a motor generator (MG) 10, a power transmission gear 20, a pair of driving wheels 30, a power control unit (PCU) 40, a system main relay (SMR) 50, a charging/discharging relay 60, an inlet 62, a power converter 70, a battery 110, an electronic control unit (ECU) 150, a navigation device 160, and a communication device 170.

The MG 10 is, for example, a three-phase AC rotating electrical machine, and may function as an electric motor and a generator. The output torque of the MG 10 is transmitted to the pair of driving wheels 30 via the power transmission gear 20 including a reduction gear, a differential gear and the like. Although the configuration illustrated in FIG. 2 is provided with only one motor generator, the number of motor generators is not limited thereto, and it may include a plurality of motor generators (for example, two motor generators).

The PCU 40 is a power conversion device that performs bi-directional power conversion between the MG 10 and the battery 110. The PCU 40 may include, for example, an inverter and a converter (none of which is shown) that operate in response to a control signal from the ECU 150. Note that the PCU 40 may not include a converter.

The SMR 50 is electrically connected to the power supply lines PL1 and NL1 connecting the battery 110 and the PCU 40. The SMR 50 operates, for example, in response to a control signal from the ECU 150.

For example, when the SMR 50 is closed (that is, in a connected state) in response to a control signal from the ECU 150, electric power may be exchanged between the battery 110 and the PCU 40. On the other hand, when the SMR 50 is opened (that is, in a disconnected state) in response to a control signal from the ECU 150, the electrical connection between the battery 110 and the PCU 40 is disconnected.

The battery 110 is a rechargeable DC power source, and may be, for example, a secondary battery such as a nickel-hydrogen battery or a lithium-ion battery containing a solid electrolyte or a liquid electrolyte. The battery 110 is an example of a power storage device that stores electric power, and is not limited to a secondary battery. For example, a capacitor or the like may be used as a DC power source instead of the battery 110.

One end of the power supply line PL2 is connected to the power supply line PL1 at a position between the SMR 50 and the PCU 40, and one end of the power supply line NL2 is connected to the power supply line NL1 at a position between the SMR 50 and the PCU 40. The other end of the power supply line PL2 and the other end of the power supply line NL2 are both connected to the inlet 62. The charging/discharging relay 60 and the power converter 70 are provided between one end of each of the power supply lines PL2 and NL2 and the other end of each of the power supply lines PL2 and NL2.

The connector 201B provided at the other end of the cable 202B connected to the charging/discharging station 200B is attached to the inlet 62. The inlet 62 is configured to allow the connector 201B to be attached thereto or detached therefrom.

The charging/discharging relay 60 is configured to switch the inlet 62 and the power converter 70 between a connected state (closed state) and a disconnected state (open state). The charging/discharging relay 60 operates, for example, in response to a control signal from the ECU 150.

For example, when the charging/discharging relay 60 is closed (that is, in a connected state) in response to a control signal from the ECU 150, electric power may be exchanged between the inlet 62 and the power converter 70. At this time, if the SMR 50 is in the connected state, the power conversion device 70 operates to charge the battery 110 with the electric power supplied from the inlet 62 (that is, to execute the power charging control) or to supply the electric power from the battery 110 to the inlet 62 (that is, to execute the power supply control).

On the other hand, when the charging/discharging relay 60 is opened in response to a control signal from the ECU 150 (that is, in a disconnected state), the electrical connection between the inlet 62 and the power converter 70 is shut off. At this time, it is impossible to supply the charging power from the power grid 500 to the battery 110 via the inlet 62.

The ECU 150 is a terminal including a CPU (Central Processing Unit) 151 and a memory (such as a ROM (Read Only Memory), a RAM (Random Access Memory) or the like) 152. The ECU 150 controls each device based on signals from various sensors and information such as maps and programs stored in the memory 152 so as to maintain the electric vehicle 100B at a desired state. Various controls performed by the ECU 150 are not limited to being processed by software, but may be processed by dedicated hardware (electronic circuit).

The ECU 150 is connected to a current sensor 154 and a voltage sensor 156. The current sensor 154 detects a current IB flowing through the battery 110. The voltage sensor 156 detects a voltage VB between both terminals of the battery 110. The current sensor 154 and the voltage sensor 156 transmit signals indicating the detection results to the ECU 150, respectively.

The ECU 150 calculates SOC (State Of Charge) of the battery 110 based on the values detected by the current sensor 154 and the voltage sensor 156. The SOC may be calculated by various known methods such as a current value integration (Coulomb count) method or an open circuit voltage (OCV) estimation method.

The navigation device 160 uses GPS to obtain the current position of the electric vehicle 100B and outputs information indicating the current position of the electric vehicle 100B to the ECU 150. The current position information of the electric vehicle 100B may be transmitted to the server 300 via the communication device 170.

The communication device 170 is configured to perform bidirectional communication with the server 300, for example. In addition, the communication device 170 may be configured to perform bidirectional communication with the user terminal 400B.

The server 300 manages a battery (such as the battery 110) mounted on each electric vehicle (such as the electric vehicle 100B) among a plurality of electric vehicles connected to the store 2 as an energy resource. The server 300 changes the amount of power demand from the power grid 500, for example, by charging or discharging batteries mounted on a plurality of electric vehicles so as to level the power demand.

As illustrated in FIG. 2, the server 300 includes a control unit 302, a communication unit 304, and a storage unit 306.

The control unit 302 includes a CPU (not shown) or the like, and is configured to execute a predetermined calculation processing based on information stored in the storage unit 306, information received from the electric vehicles 100A and 100B via the communication unit 304, information received from the user terminals 400A and 400B via the communication unit 304, or information received from the store terminal 2a via the communication unit 304. The predetermined calculation processing includes the predetermined image processing mentioned above.

The communication unit 304 is configured to communicate with each of the electric vehicles 100A and 100B, each of the user terminals 400A and 400B, and the store terminal 2a, respectively. The communication unit 304 and its communication target exchange information with each other via a predetermined communication format. The predetermined communication format may be wired communication or wireless communication, for example.

The storage unit 306 includes a memory such as a ROM or a RAM, and a large-capacity storage device such as a hard disk or a solid state drive. The storage unit 306 stores, for example, a communication history about conditions of the electric vehicles 100A and 100B (such as SOC of the battery), a communication history about movements of the user terminals 400A and 400B, and/or an image or a video captured by the camera 2c and received from the store terminal 2a.

As described above, the store terminal 2a transmits an image or a video captured by the camera 2c, or information indicating that the electric vehicle is connected to a charging/discharging station to the server 300.

As illustrated in FIG. 2, the store terminal 2a includes a control unit 2d, a storage unit 2e, and a communication unit 2f.

The control unit 2d includes a CPU (not shown) or the like, and is configured to execute a predetermined calculation processing based on the payment information or the settlement information acquired from the register 2b via the communication unit 2f, images or videos acquired from the camera 2c via the communication unit 2f, information received from the server 300 via the communication unit 2f, or the like.

The storage unit 2e includes a memory such as a ROM or a RAM, and a large-capacity storage device such as a hard disk or a solid state drive. The storage unit 2e stores, for example, an image or a video captured by the camera 2c.

The communication unit 2f is configured to communicate with the communication unit 304 of the server 300. The communication unit 2f and its communication target exchange information with each other via predetermined wireless communication.

As described above, each of the user terminals 400A and 400B transmits the position information of the user terminals 400A and 400B acquired by the position measurement device together with the unique identification information thereof to the server 300. The position of the user terminal 400A or 400B may be determined based on the unique identification information and the position information.

As illustrated in FIG. 2, the user terminal 400B includes a control unit 402, a communication unit 404, and a position measurement unit 406.

The control unit 402 includes a CPU (not shown) or the like, and is configured to execute a predetermined calculation processing based on the position information acquired by the position measurement unit 406, the information received from the server 300 via the communication unit 404, or the like.

As described above, the position measurement unit 406 acquires the position information of the user terminal 400B. The acquired position information is transmitted to the control unit 402, or transmitted to the server 300 via the communication unit 404, or stored in a storage unit (not shown).

The communication unit 404 is configured to communicate with the communication unit 304 of the server 300. The communication unit 404 and its communication target exchange information with each other via predetermined communication.

In the power management system 1 having the above-mentioned configuration, the server 300 changes the amount of power demand from the power grid 500 by charging or discharging the battery 110 mounted on each of the plurality of electric vehicles 100A and 100B connected to the charging/discharging stations 200A and 200B installed in the store 2 during an appropriate period so as to level the power demand.

The power demand leveling requires that a plurality of electric vehicles are continuously connected to the charging stations. However, in a place such as the store 2 where people frequently go in and out, users may use electric vehicles at the time of going home, and thereby, it is difficult to maintain a plurality of electric vehicles connected. In other words, even if the electric vehicles are connected to the charging stations at a time where the power demand leveling is scheduled, after the start of the power demand leveling or during the power demand leveling, the number of electric vehicles used for the power demand leveling may decrease. Therefore, the store 2 may not have sufficient amount of charging and discharging power required to level the power demand.

In the present embodiment, the power management system 1 operates as follows.

Specifically, the server 300 acquires behavior information indicating a behavior condition of each user U1 or U2 of the electric vehicle 100A or 100B from various information terminals including the user terminals 400A and 400B and the store terminal 2a. Based on the acquired behavior information, the server 300 predicts a connection period from a time when the user U1 or U2 connects the electric vehicle 100A or 100B to the charging/discharging station 200A or 200B to a time when the electric vehicle 100A or 100B is to be used. The server 300 adjusts the electric power to be exchanged between the power grid 500 and the plurality of charging/discharging stations 200A and 200B during the power demand and supply adjustment period by using an electric vehicle among the plurality of electric vehicles 100A and 100B whose connection period includes the power demand and supply adjustment period.

An electric vehicle whose connection period includes the power demand and supply adjustment period will not be used during the power demand and supply adjustment period. Therefore, by using such an electric vehicle to adjust the electric power to be exchanged between the charging/discharging station and the power grid during the power demand and supply adjustment period, it is possible to level the power demand without having the number of electric vehicles reduced.

Figure 3:
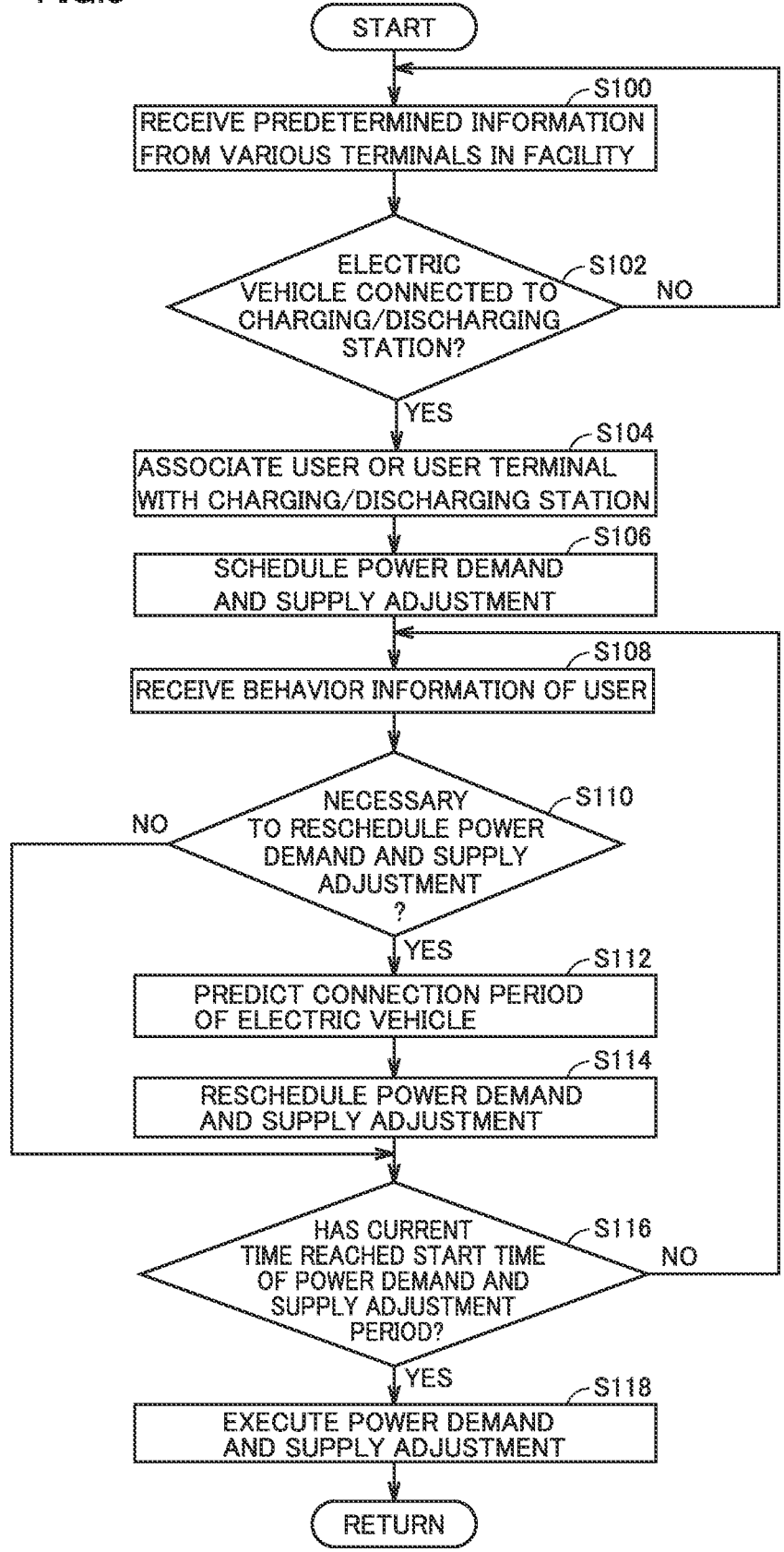
FIG. 3 is a flowchart illustrating an example process to be executed in a server.

Hereinafter, a process to be executed by the server 300 (specifically, the control unit 302 of the server 300) in the present embodiment will be described with reference to FIG. 3. FIG. 3 is a flowchart illustrating an example process to be executed by the server 300. The server 300 executes the following process for each parking space where one charging/discharging station is installed. In the following description, as an example, the process will be executed for a parking space where the charging/discharging station 200B is installed.

In step (hereinafter will be abbreviated as "S") 100, the server 300 receives predetermined information about an electric vehicle parked in the parking lot 3 and the user of the electric vehicle from various terminals in the facility including the store 2.

The various terminals include, for example, at least one of the store terminal 2a, the ECU 150 of each electric vehicle in the facility, and the user terminal carried by the user of each electric vehicle in the facility.

The predetermined information includes, for example, information that may be used to identify a user (for example, an image captured by the camera 2c installed at the parking space), information that may be used to identify an electric vehicle (for example, identification information or position information of the electric vehicle), and information that may be used to identify a user terminal (for example, identification information or position information of the user terminal).

For example, the server 300 may receive predetermined information from the user terminal or the electric vehicle after the user terminal or the electric vehicle is connected to a predetermined wireless communication service (such as a WiFi spot) provided in the store 2 and thereby becomes communicable with the server 300.

In S102, the server 300 determines whether or not the electric vehicle is connected to the charging/discharging station 200B. For example, when the server 300 receives predetermined information from the store terminal 2a, the server 300 determines that the electric vehicle is connected to the charging/discharging station 200B. When the store terminal 2a receives information indicating that the connector 201B provided at the other end of the cable 202B connected to the charging/discharging station 200B is connected to the inlet 62 of the electric vehicle, the store terminal 2a transmits predetermined information to the server 300. If it is determined that the electric vehicle is connected to the charging/discharging station 200B (YES in S102), the process proceeds to S104. On the other hand, if it is determined that the electric vehicle is not connected to the charging/discharging station 200B (NO in S102), the process returns to S100.

In S104, the server 300 associates the user of the electric vehicle or the user terminal with the charging/discharging station 200B.

Specifically, for example, when the communication with a user terminal is available, and when the position information received from the user terminal indicates the user terminal is positioned at the parking space where the charging/discharging station 200B is installed, the server 300 determines that the user terminal is a terminal carried by the user of the electric vehicle connected to the charging/discharging station 200B, and stores the identification information of the user terminal in association with the identification information of the charging/discharging station 200B in the storage unit 306. In addition, when the server 300 is communicable with the electric vehicle connected to the charging/discharging station 200B, the server 300 may further associate the identification information of the electric vehicle with the identification information of the user terminal and/or the charging/discharging station 200B, and stores the association information in the storage unit 306.

Further, when the server 300 determines that the electric vehicle is moving toward the parking space where the charging/discharging station 200B is installed based on, for example, an image captured by the camera 2c, the server 300 extracts an image of the user of the electric vehicle from the image captured by the camera 2c, and stores the extracted image of the user in association with the identification information of the charging/discharging station 200B in the storage unit 306. In addition, the server 300 may further associate an image of the electric vehicle extracted from the image captured by the camera 2c and the user's image with the identification information of the charging/discharging station 200B, and store the association information in the storage unit 306. Further, for example, when the server 300 is communicable with the user terminal or the electric vehicle, the server 300 may associate the identification information of the user terminal or the electric vehicle and the user's image with the identification information of the charging/discharging station 200B, and store the association information in the storage unit 306.

In S106, the server 300 schedules a power demand and supply adjustment. The server 300 schedules the power demand and supply adjustment by using an electric vehicle connected to the charging/discharging station 200B. For example, when the server 300 receives a period and an adjustment amount for adjusting the power demand and supply from a superior aggregator, the server 300 sets the received period as the power demand and supply adjustment period, and selects an electric vehicle that may operate to exchange electric power corresponding to the adjustment amount during the period. For example, the server 300 sets charging power or feeding power by equally dividing the required electric power by the number of electric vehicles connected to the charging/discharging station. For example, the server 300 calculates electric power by dividing the adjustment amount by the power demand and supply adjustment period as the required electric power, and sets a value obtained by dividing the calculated electric power by the number of electric vehicles as the charging power or feeding power of each electric vehicle.

In S108, the server 300 receives behavior information indicating the behavior condition of the user in association with the charging/discharging station 200B. The server 300 receives the behavior information of the user in association with the charging/discharging station 200B from, for example, at least one of the store terminal 2a, the electric vehicle connected to the charging/discharging station 200B, and the user terminal.

For example, if the server 300 is communicable with the user terminal, the server 300 receives the position information of the user terminal as the behavior information. Further, when the server 300 is communicable with the user terminal and reservation information of visiting the store 2 is set in the user terminal, the server 300 receives the reservation information about the reservation time and the destination as the behavior information. If the server 300 is communicable with the user terminal and the user terminal may acquire biological information of the user, the server 300 receives the biological information of the user as behavior information. The biological information may include, for example, the number of steps and change history thereof, calorie consumption and change history thereof, body temperature and change history thereof, heart rate and change history thereof, blood pressure and change history thereof, and information indicating whether or not the user is sleeping.

For example, if the server 300 is communicable with the electric vehicle connected to the charging/discharging station 200B, the server 300 receives the charging end time set in the electric vehicle as the behavior information. Further, if the server 300 is communicable with the electric vehicle connected to the charging/discharging station 200B and reservation information of visiting the store 2 is set in the electric vehicle, the server 300 receives the reservation information as the behavior information.

The server 300 receives, for example, an image of the user captured by the camera 2c of the store terminal 2a as the behavior information. For example, the server 300 extracts an image of a user from the image captured by the camera 2c, and identifies an image that matches the image of the user of the electric vehicle captured at the parking space where the charging/discharging station 200B is installed from the extracted image. The server 300 identifies a time and a location at which the image of the user is photographed. When the server 300 is communicable with the user terminal, the server 300 may determine the position of the user based on the position information of the user terminal and extract an image of the user from the image corresponding to the determined position.

For example, the server 300 receives payment information or settlement information relating to the payment by a user for a purchased product or for the utilization of a facility in the store 2 as the behavior information. For example, when the server 300 is communicable with the user terminal and the payment or the settlement is processed on the user terminal, the server 300 may receive the payment information or the settlement information from the user terminal as the behavior information. Alternatively, the server 300 may receive payment information or settlement information which coincide with the time and location of the payment or the settlement by a user for a purchased product from the store terminal 2a as the behavior information. The server 300 may determine the time and location of the payment or the settlement by a user for a purchased product based on, for example, the photographing time of an image of the user extracted from the image captured by the camera 2c and the position of the user in the store 2 determined from the image of the user.

In S110, the server 300 determines whether or not it is necessary to reschedule the power demand and supply adjustment for the electric vehicle connected to the charging/discharging station 200B.

For example, when the server 300 receives the position information of the user terminal or an image of the user as the behavior information, the server 300 determines that it is necessary to reschedule the power demand and supply adjustment for the electric vehicle connected to the charging/discharging station 200B if the distance between the user terminal or the user and the parking space where the charging/discharging station 200B is installed is equal to or less than a threshold value and the user terminal or the user is moving toward the parking space where the charging/discharging station 200B is installed.

For example, when the server 300 receives the reservation information from a user terminal or an electric vehicle as the behavior information, the server 300 determines that it is necessary to reschedule the power demand and supply adjustment for the electric vehicle connected to the charging/discharging station 200B if the current time has elapsed from the reservation time for a predetermined length or more.

When the server 300 receives the charging end time from the electric vehicle connected to the charging/discharging station 200B as the behavior information, the server 300 determines that it is necessary to reschedule the power demand and supply adjustment for the electric vehicle connected to the charging/discharging station 200B if the current time has passed a preset time set before the charging end time.

When the server 300 receives the payment information or the settlement information as the behavior information, the server 300 determines that it is necessary to reschedule the power demand and supply adjustment for the electric vehicle connected to the charging/discharging station 200 if a product included in the payment information is a predetermined product or the payment destination is a predetermined payment destination. The predetermined product may include, for example, frozen food such as ice cream, fresh food, or a movie ticket or a bathing ticket. The server 300 may acquire information about a product included in the payment information from, for example, a POS (Point Of Sales) system.

When the server 300 receives the biological information as the behavior information, the server 300 determines that it is necessary to reschedule the power demand and supply adjustment for the electric vehicle connected to the charging/discharging station 200B if it is determined that the user is sleeping, having a meal, or having a bath based on the received biological information.

If it is determined that it is necessary to reschedule the power demand and supply adjustment for the electric vehicle connected to the charging/discharging station 200B (YES in S110), the process proceeds to S112. If it is determined that it is not necessary to reschedule the power demand and supply adjustment (NO in S110), the process proceeds to S116.

In S112, the server 300 predicts a time period (hereinafter, sometimes referred to as a connection period) of the electric vehicle connected to the charging/discharging station 200B until the electric vehicle is used for the next time.

For example, if it is determined that the user terminal is moving toward the parking space where the charging/discharging station 200B is installed, the server 300 calculates an arrival time from a distance between the user terminal and the parking space and an average moving speed of the user terminal in a predetermined time. The server 300 calculates the travel time by subtracting the current time from the arrival time as the connection period.

If it is determined that the current time is a time that has elapsed from the reservation time for a predetermined length or more, the server 300 calculates a travel time for the user to travel from the location where the reservation is made (or the position of the user or the user terminal) to the parking space as the connection period. Since the method of calculating the travel time is the same as that described above, the detailed description thereof will not be repeated.

If it is determined that the product purchased by the user is frozen food such as ice cream or fresh food, the server 300 calculates a travel time for the user to travel from the location where the product is purchased (or the position of the user or the user terminal 400B) to the parking space as the connection period.

If it is determined that the product purchased by the user is a movie ticket or a bathing ticket, the server 300 calculates a time obtained by adding a travel time for the user to travel from the location of a movie facility or a bathing facility (or the position of the user or the user terminal) to the parking space to an end time of the movie or an expected end time of bathing, and calculates a time period by subtracting the current time from the calculated time as the connection period.

If it is determined that the user is sleeping, having a meal, or having a bath, the server 300 calculates a time obtained by adding the travel time for the user to travel from the position of the user terminal to the parking space to an expected end time of the sleep, meal or bath, and calculates a time period by subtracting the current time from the calculated time as the connection period. For example, the server 300 may acquire an average value of sleep time, meal time, or bath time of the user from the user terminal, and calculate an expected end time using the acquired average value.

In S114, the server 300 reschedules the power demand and supply adjustment. More specifically, if the power demand and supply adjustment period is included in the connection period, the server 300 maintains the electric vehicle connected to the charging/discharging station 200 as a control target of the power demand and supply adjustment. Therefore, the server 300 maintains the charging power or the feeding power as that scheduled in S106.

If the power demand and supply adjustment period is not included in the connection period, the server 300 excludes the electric vehicle connected to the charging/discharging station 200B from the control targets of the power demand and supply adjustment. Therefore, the server 300 uses the other electric vehicles as the control targets to set the charging power or the feeding power during the power demand and supply adjustment period. Note that the specific method of setting the charging power or the feeding power is the same as that described above, and therefore, the detailed description thereof will not be repeated.

In S116, the server 300 determines whether or not the current time has reached the start time of the power demand and supply adjustment period. If it is determined that the current time has reached the start time of the power demand and supply adjustment period (YES in S116), the process proceeds to S118. On the other hand, if it is determined that the current time has not reached the start time of the power demand and supply adjustment period (NO in S116), the process returns to S108.

In S118, the server 300 executes the power demand and supply adjustment. For example, the server 300 instructs the charging/discharging station 200B to charge the battery 110 with the set charging power or instructs an electric vehicle connected to the charging/discharging station 200B to supply from the battery 110 with the set feeding power. When the end time of the power demand and supply adjustment period is reached, the server 300 instructs the charging/discharging station 200B to stop charging the battery 110 or instructs the electric vehicle connected to the charging/discharging station 200B to stop supplying power from the battery 110.

Figure 4:
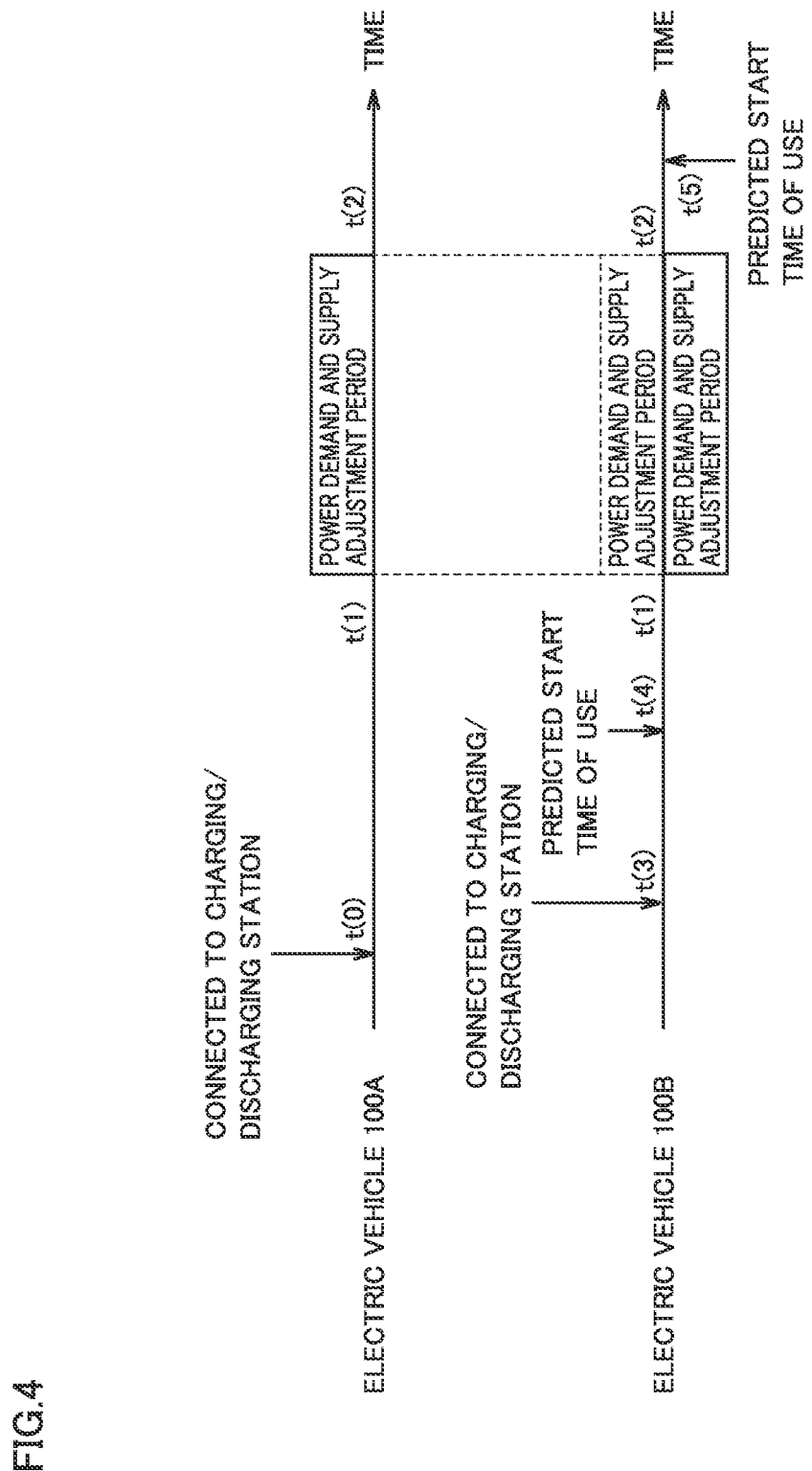
FIG. 4 is a timing chart for explaining an example operation of the server.

The operation of the server 300 based on the above-described structure and the flowchart will be described with reference to FIG. 4. FIG. 4 is a timing chart for explaining an example operation of the server 300.

<Example Operation of the Server 300 when the Electric Vehicle 100A is Parked at a Parking Space>

As an example, it is assumed that the electric vehicle 100A is driven by the user U1 who is carrying the user terminal 400A, and is parked in the parking lot 3 at a parking space where the charging/discharging station 200A is installed.

At this time, the server 300 receives predetermined information from various terminals in the facility including the store 2 (S100). If the server 300 is communicable with a plurality of user terminals including the user terminals 400A and 400B, for example, the server 300 receives the identification information and the position information of a user terminal in communication with the server 300. Further, if the server 300 is communicable with a plurality of electric vehicles including the electric vehicles 100A and 100B, for example, the server 300 receives the identification information and the position information of an electric vehicle in communication with the server 300.

When the connector 201A provided at the other end of the cable 202A connected to the charging/discharging station 200A is connected to the inlet 62 of the electric vehicle 100A at time t(0) (YES in S102), the user of the electric vehicle or the user terminal 400A is associated with the charging/discharging station 200A (S104).

For example, if the user terminal 400A is positioned at the parking space where the charging/discharging station 200A is installed, the server 300 associates the user terminal 400A with the charging/discharging station 200A, and stores the association information.

Then, the electric vehicle 100A is added to the electric vehicles selected as the control targets among the plurality of electric vehicles parked in the parking lot 3, and the power demand and supply adjustment is scheduled (S106). At this time, a period from time t(1) to time t(2) is set as the power demand and supply adjustment period.

Next, the server 300 receives, for example, the position information and the payment information from the user terminal 400A as the behavior information (S108), and if the distance between the user terminal 400A and the parking space where the charging/discharging station 200A is installed is larger than a threshold value and the product included in the payment information is not a predetermined product, the server 300 determines that it is not necessary to reschedule the power demand and supply adjustment for the electric vehicle 100A (YES in S110). Therefore, when the current time reaches the start time t(1) of the power demand and supply adjustment period (YES in S116), the power demand and supply adjustment is executed (S118) without being rescheduled.

<Example Operation of the Server 300 when the Electric Vehicle 100B is Parked at a Parking Space>

As an example, it is assumed that the electric vehicle 100B is driven by the user U2, and is parked in the parking lot 3 of the store 2 at a parking space where the charging/discharging station 200B is installed.

At this time, the server 300 receives predetermined information from various terminals in the facility including the store 2 (S100). For example, the server 300 receives, from the store terminal 2a, an image captured by the camera 2c installed at the parking space where the charging/discharging station 200A is installed.

When the connector 201B provided at the other end of the cable 202B connected to the charging/discharging station 200B is connected to the inlet 62 of the electric vehicle 100B at time t(3) (YES in S102), the user of the electric vehicle or the user terminal 400B is associated with the charging/discharging station 200B (S104).

For example, the server 300 extracts an image of the user from images captured by the camera 2c until the electric vehicle 100B is parked at a parking space where the charging/discharging station 200B is installed, and stores the extracted image of the user in association with the identification information of the charging/discharging station 200B.

Then, the electric vehicle 100B is added to the electric vehicles selected as the control targets among the plurality of electric vehicles parked in the parking lot 3, and the power demand and supply adjustment is rescheduled (S106). At this time, a period from time t(1) to time t(2) is set as the power demand and supply adjustment period.

Next, the server 300 receives an image captured by the camera 2c in the store 2 from the store terminal 2a as the behavior information (S108). Then, an image of the user of the electric vehicle 100B is extracted from the image captured by the camera 2c in the store 2. When it is determined that the distance between the extracted position of the user in the store 2 and the parking space where the charging/discharging station 200B is installed is equal to or less than a threshold value and the user is moving toward the parking space, it is determined that it is necessary to reschedule the power demand and supply adjustment for the electric vehicle 100B (YES in S110). At this time, the travel time to the parking space of the user is predicted as the connection period (S112), and the power demand and supply adjustment is rescheduled (S114).

At this time, time t(4) is predicted as the start time of use. In this case, since the predicted start time of use t(4) is earlier than the time t(1) and the power demand and supply adjustment period is not included in the connection period of the electric vehicle 100B, the electric vehicle 100B is excluded from the control targets of the electric power demand and supply adjustment. As a result, the charging power or the feeding power is not set for the electric vehicle 100B during the demand and supply adjustment period. Therefore, even when the current time reaches the start time t(1) of the power demand and supply adjustment period (YES in S116) and the power demand and supply adjustment is executed (S118), the battery 110 in the electric vehicle 100B will not be charged or the power will not be supplied from the battery 110 in the electric vehicle 100B.

On the other hand, time t(5) is predicted as the start time of use. In this case, since the predicted start time of use t(5) is later than time t(2) and the power demand and supply adjustment period is included in the connection period of the electric vehicle 100B, the electric vehicle 100B is selected as a control target of the power demand and supply adjustment. As a result, when the current time reaches the start time t(1) of the power demand and supply adjustment period (YES in S116) and the power demand and supply adjustment is executed (S118), the electric power is exchanged between the electric vehicle 100B and the power grid 500 with the amount set in the scheduled power demand and supply adjustment.

As described above, according to the power management system 1 of the present embodiment, if the power demand and supply adjustment period is included in the connection period of an electric vehicle until it is to be used for the next time, the electric vehicle will not be used during the power demand and supply adjustment period. Therefore, by using such an electric vehicle to adjust the electric power to be exchanged between the charging/discharging station and the power grid during the power demand and supply adjustment period, it is possible to level the power demand without having the number of electric vehicles reduced. Further, if the power demand and supply adjustment period is not included in the connection period of an electric vehicle, the electric vehicle may be used during the power demand and supply adjustment period. Thus, by adjusting the electric power to be exchanged between the charging/discharging station and the power grid during the power demand and supply adjustment period without using such an electric vehicle, it is possible to level the power demand without having the number of electric vehicles reduced. Therefore, it is possible to provide a power management system, a power management method, and a power management apparatus that can appropriately level the power demand in accordance with the use of the electric vehicle.

Further, the connection period may be predicted using at least one of the position information of the user terminal, the payment information or settlement information of the user, and the position information of the user. Therefore, by using such an electric vehicle that the connection period thereof includes the power demand and supply adjustment period to adjust the electric power to be exchanged between the charging/discharging station and the power grid during the power demand and supply adjustment period, it is possible to level the power demand without having the number of electric vehicles reduced.

Hereinafter, modifications of the present embodiment will be described.

In the above embodiment, as an example, it is described that the plurality of electric vehicles including the electric vehicles 100A and 100B are electric vehicles, but the plurality of electric vehicles may include a hybrid vehicle which may travel on electric power and is equipped with an engine and a battery.

In the above embodiment, as an example, it is described that the electric power is exchanged between a charging/discharging station and the battery 110 by attaching a connector of the charging/discharging station to the inlet 62, but the electric power may be exchanged between the charging/discharging station and the battery 110 in a non-contact manner.

In the above embodiment, as an example, it is described that the electric power to be exchanged between the power grid 500 and the store 2 to which a plurality of electric vehicles are connected is adjusted during the demand and supply adjustment period, but the connection object of the power grid 500 is not particularly limited to the store 2, and the connection object may be, for example, any building other than a store (for example, a residence, an office building, a factory, or the like) or may be a plurality of buildings.

In the above embodiment, as an example, it is described that a single piece of behavior information is used to predict the connection period, but for example, a plurality of connection periods may be predicted using a plurality of pieces of behavior information, and if at least one of the predicted connection periods does not include the power demand and supply adjustment period, an electric vehicle whose connection period does not include the power demand and supply adjustment period may not be used as a control target.

In the above embodiment, as an example, it is described that a single piece of behavior information is used to predict the connection period, but for example, the connection period may be predicted by AI, machine learning or the like which uses a plurality of pieces of behavior information as an input information. Thereby, the connection period may be predicted with higher accuracy.

In the above embodiment, as an example, it is described that the charging end time is received from the electric vehicle as the behavior information, but for example, if the destination set in the navigation device 160 is a place other than the store 2, the information of the destination may be received as the behavior information. When the server 300 receives the destination information, the server 300 may determine that it is necessary to reschedule the power demand and supply adjustment, and may predict the connection period based on the travel time from the store 2 to the destination.

In the above embodiment, as an example, it is described that the information indicating that the electric vehicle is connected to the charging/discharging station is received from the store terminal 2a, but for example, when the server 300 is communicable with the electric vehicle, the server 300 may receive the information indicating that the electric vehicle is connected to the charging/discharging station from the electric vehicle.

In the above embodiment, as an example, it is described that the server 300 receives the position information of the user or the user terminal as the behavior information, but for example, the server 300 may receive a sojourn time of the user or the user terminal in the store 2 as the behavior information. The server 300 may determine that it is necessary to reschedule the power demand and supply adjustment, for example, when the sojourn time is equal to or greater than a threshold value or when the difference between the average value of the sojourn times in the store 2 in the past and the current sojourn time is smaller than the threshold value.

In the above embodiment, as an example, it is described that the user terminal is used to process the payment or the settlement, and alternatively, face authentication of the user may be used to process the payment or the settlement, for example. In this case, the server 300 receives an image of the user acquired at the time of face authentication and the payment information or the settlement information from the store terminal 2a as the behavior information. The server 300, for example, may determine whether or not the user of an electric vehicle has finished the payment or the settlement based on a comparison result between an image of the user acquired at the time of face authentication and an image of the user extracted from the image captured by the camera 2c installed at the parking space.

In the above embodiment, as an example, it is described that the reservation information is received from the user terminal as the behavior information, but if a schedule is registered after the current time, information about the registered schedule may be received as the behavior information, and the server 300 may determine that it is necessary to reschedule the power demand and supply adjustment, and may predict the connection period by using the start time of the registered schedule.

In the above embodiment, as an example, it is described that the behavior information of the user is used to predict the connection period, and reschedule the power demand and supply adjustment accordingly, but the electric power to be charged to or the electric power to be supplied from each electric vehicle may be determined based on information about the SOC (such as information about the current SOC, information about a upper limit or a lower limits of the SOC), the presence or absence of a failure in a plurality of electric vehicles, the capacity of a charging/discharging station or the like in addition to the connection period.

In the above embodiment, as an example, it is described that the connection period is predicted by assuming that one electric vehicle is driven by a single user, but one electric vehicle may be driven by a plurality of users. For example, one electric vehicle parked in a parking lot of a residence may be driven by a plurality of users such as family members, housemates or the like. In this case, each connection period may be predicted for each user by using the behavior information of the plurality of users, and if the power demand and supply adjustment period is not included in at least one of the plurality of predicted connection periods, the electric vehicle may be excluded from the control targets.

In the above embodiment, as an example, it is described that the connection period is predicted by assuming that one electric vehicle is driven by a single user, but a plurality of electric vehicles may be driven by a plurality of users. For example, a plurality of electric vehicles parked in a parking lot of a residence may be driven by a plurality of users such as family members, housemates or the like. In this case, each connection period may be predicted for each user of each electric vehicle, and if the power demand and supply adjustment period is not included in at least one of the plurality of predicted connection periods, the electric vehicle may be excluded from the control targets.

In the above embodiment, as an example, it is described that the server 300 sends a charging control or power supply control command to an electric vehicle via the communication network when the current time reaches the start time of the power demand and supply adjustment period, but the server 300 may directly send the charging control or power supply control command to an electric vehicle when the server 300 is communicable with the electric vehicle.

In the above embodiment, as an example, it is described that the travel time is predicted as the connection period, but for example, a total time of a predetermined margin and the travel time may be predicted as the connection period.

In the above embodiment, as an example, it is described that the electric power is continuously exchanged between an electric vehicle to be controlled and the charging/discharging station during the demand and supply adjustment period at a constant amount, but the electric power may be intermittently exchanged between each electric vehicle to be controlled and the charging/discharging station during the demand and supply adjustment period as long as the requested amount of electric power is continuously exchanged between the store 2 and the power grid 500 during the demand and supply adjustment period.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A power management system that manages electric power to be exchanged between a power grid and a charging/discharging station to be connected to a plurality of electric vehicles, each of the plurality of electric vehicles being equipped with a power storage device, the power management system comprising:

a server that adjusts the electric power to be exchanged between the charging/discharging station and the power grid; and an information terminal that communicates with the server, the information terminal including at least one of a first terminal and a second terminal, the first terminal being carried by a user of any one of the plurality of electric vehicles and the second terminal acquiring information about the plurality of electric vehicles and/or the user from a facility where the charging/discharging station is disposed, the server operating to acquire, from the information terminal, behavior information indicating a behavior condition of each user of the plurality of electric vehicles, determine whether rescheduling of a power demand and supply adjustment is necessary based on the acquired behavior information;

when it is determined that the rescheduling of the power demand and supply adjustment is necessary, predict a connection period of an electric vehicle connected to the charging/discharging station until the electric vehicle is used for the next time, and adjust the electric power to be exchanged between the charging/discharging station and the power grid during a power demand and supply adjustment period by using a first electric vehicle among the plurality of electric vehicles, the connection period of the first electric vehicle including the power demand and supply adjustment period.

2. The power management system according to claim 1, wherein the server adjusts the electric power to be exchanged between the power grid and the charging/discharging station during the power demand and supply adjustment period without using the first electric vehicle among the plurality of electric vehicles, the connection period of the first electric vehicle not including the power demand and supply adjustment period.

3. The power management system according to claim 1, wherein the behavior information includes at least one of
position information of the first terminal acquired from the first terminal,
payment information or settlement information of the user acquired from the second terminal, and
position information of the user acquired from an image of the user captured by the second terminal.

4. A power management method that uses an information terminal to manage electric power to be exchanged between a power grid and a charging/discharging station to be connected to a plurality of electric vehicles, each of the plurality of electric vehicles being equipped with a power storage device, wherein the information terminal includes at least one of a first terminal and a second terminal, the first terminal being carried by a user of any one of the plurality of electric vehicles, the second terminal acquiring information about the plurality of electric vehicles and/or the user from a facility where the charging/discharging station is disposed, the power management method comprising:

acquiring, from the information terminal, behavior information indicating a behavior condition of each user of the plurality of electric vehicles;

determining whether rescheduling of a power demand and supply adjustment is necessary based on the acquired behavior information;

when it is determined that the rescheduling of the power demand and supply adjustment is necessary, predicting a connection period of an electric vehicle connected to the charging/discharging station until the electric vehicle is used for the next time; and adjusting the electric power to be exchanged between the charging/discharging station and the power grid during a power demand and supply adjustment period by using a first electric vehicle among the plurality of electric vehicles, the connection period of the first electric vehicle including the power demand and supply adjustment period.

5. A power management apparatus that uses an information terminal to manage electric power to be exchanged between a power grid and a charging/discharging station to be connected to a plurality of electric vehicles, each of the plurality of electric vehicles being equipped with a power storage device, wherein the information terminal includes at least one of a first terminal and a second terminal, the first terminal being carried by a user of any one of the plurality of electric vehicles and the second terminal acquiring information about the plurality of electric vehicles and/or the user from a facility where the charging/discharging station is disposed, the power management apparatus operating to
acquire, from the information terminal, behavior information indicating a behavior condition of each user of the plurality of electric vehicles,
determine whether rescheduling of a power demand and supply adjustment is necessary based on the acquired behavior information;
when it is determined that the rescheduling of the power demand and supply adjustment is necessary, predict a connection period of an electric vehicle connected to the charging/discharging station until the electric vehicle is used for the next time, and
adjust the electric power to be exchanged between the charging/discharging station and the power grid during a power demand and supply adjustment period by using a first electric vehicle among the plurality of electric vehicles, the connection period of the first electric vehicle including the power demand and supply adjustment period.

* * * * *